US012760856B2

(12) United States Patent
Mügge et al.

(10) Patent No.: US 12,760,856 B2
(45) Date of Patent: Oct. 13, 2026

(54) LIGHTING DEVICE FOR VEHICLES

(71) Applicant: Hella GmbH & Co. KGaA, Lippstadt (DE)

(72) Inventors: Martin Mügge, Geseke (DE); Martin Vollmer, Anröchte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 19/175,303

(22) Filed: Apr. 10, 2025

(65) Prior Publication Data

US 2025/0237364 A1 Jul. 24, 2025

Related U.S. Application Data

(63) Continuation of application No. PCT/EP2023/077843, filed on Oct. 9, 2023.

(30) Foreign Application Priority Data

Oct. 18, 2022 (DE) ........................ 102022127235.4

(51) Int. Cl.
*F21S 41/24* (2018.01)
*F21S 41/37* (2018.01)

(52) U.S. Cl.
CPC ............... *F21S 41/24* (2018.01); *F21S 41/37* (2018.01)

(58) Field of Classification Search
CPC ...... F21S 43/235; F21S 43/236; F21S 43/241; F21S 43/245
See application file for complete search history.

(56) References Cited

U.S. PATENT DOCUMENTS

| | | | | |
|---|---|---|---|---|
| 10,203,442 | B2 * | 2/2019 | Watanabe | G02B 6/0023 |
| 10,908,350 | B2 * | 2/2021 | Vasylyev | G02B 6/0076 |
| 11,703,625 | B2 * | 7/2023 | Yagi | G02B 6/0028 362/606 |
| 2008/0212315 | A1 | 9/2008 | Cornelissen et al. | |
| 2009/0073708 | A1 | 3/2009 | Kino et al. | |
| 2011/0090713 | A1 | 4/2011 | Chen et al. | |
| 2014/0056028 | A1 | 2/2014 | Nichol et al. | |
| 2015/0219827 | A1 | 8/2015 | Kim et al. | |
| 2019/0227382 | A1 * | 7/2019 | Watanabe | G02B 6/0028 |
| 2019/0275925 | A1 * | 9/2019 | Chen | F21S 43/26 |
| 2020/0049877 | A1 * | 2/2020 | Watanabe | G02F 1/133606 |
| 2022/0120402 | A1 | 4/2022 | Woodgate et al. | |
| 2023/0408054 | A1 * | 12/2023 | Muegge | F21S 43/14 |

(Continued)

FOREIGN PATENT DOCUMENTS

| | | | |
|---|---|---|---|
| CN | 108662547 | A | 10/2018 |
| DE | 69232922 | T2 | 12/2003 |
| DE | 202006003392 | U1 | 5/2006 |

(Continued)

*Primary Examiner* — Eric T Eide
(74) *Attorney, Agent, or Firm* — Husch Blackwell LLP

(57) ABSTRACT

A lighting device for vehicles has a light source and a flat optical waveguide with opposing flat sides and narrow sides connecting them. A front flat side is the light emitting surface for light from the light source entering the flat optical waveguide. The front flat side has dedicated micro-optical elements. The optical waveguide is flexible, and framed on at least the opposing narrow sides by retaining elements such that the optical waveguide has a defined curvature in the assembled state.

17 Claims, 3 Drawing Sheets

(56) References Cited

U.S. PATENT DOCUMENTS

2025/0043931 A1 * 2/2025 Hasek .................. F21S 41/285

FOREIGN PATENT DOCUMENTS

| | | | |
|---|---|---|---|
| DE | 102011016000 | A1 | 10/2012 |
| DE | 102015217242 | A1 | 3/2016 |
| DE | 102016121047 | A1 | 5/2017 |
| DE | 102017122321 | A1 | 3/2018 |
| DE | 102018218441 | A1 | 4/2020 |
| DE | 102019133693 | A1 | 6/2021 |
| JP | 2014146750 | A | 8/2014 |
| JP | 2019530966 | A | 10/2019 |
| KR | 20150138709 | A | 12/2015 |

* cited by examiner

LIGHTING DEVICE FOR VEHICLES

CROSS REFERENCE

This application claims priority to PCT Application No. PCT/EP2023/077843, filed Oct. 9, 2023, which itself claims priority to German Patent Application No. 10 2022 127235.4, filed Oct. 18, 2022, the entireties of both of which are hereby incorporated by reference.

FIELD OF THE INVENTION

The invention relates to a lighting device for vehicles that has a light source and a flat optical waveguide with opposing flat sides and narrow sides connecting them, in which a front flat side emits light from the light source entering the optical waveguide, and has dedicated micro-optical elements.

BACKGROUND OF THE INVENTION

A lighting device for vehicles is disclosed in DE 10 2019 133 693 A1 that contains a flat optical waveguide with opposing flat sides and narrow sides connecting them. A light source is placed at one of the narrow sides of the optical waveguide where light enters it. For the light to be able to exit the front flat side of the optical waveguide, there is an optical panel with numerous micro-optical elements, which lies on the front side of the optical waveguide with the side that has the micro-optical elements. This advantageously results in a homogenous lighting at the front side of the optical waveguide. Because the optical panel and optical waveguide are produced in an injection molding process, it is relatively difficult to produce optical waveguides with different curvatures that follow the surface curvatures of a headlamp. In particular, if equidistant spacing between the waveguide and a cover lens for the lighting device housing must be maintained, it is necessary to have different tools for producing a corresponding number of waveguides with different curvatures.

BRIEF SUMMARY OF THE INVENTION

The object of the present invention is to therefore create a lighting device for vehicles with which a homogenous lighting is obtained over a surface, in which different surface curvatures can be obtained in a simple manner.

This object is obtained in that the optical waveguide is flexible, and held by retaining elements on opposite narrow sides such that it has a defined curvature in the assembled state.

The particular advantage of the invention is that the surface curvature of the optical waveguide in the assembled state is not dependent on the production thereof, but instead on a frame or partial frame to which the optical waveguide is attached with retaining elements. Identical optical waveguides can be used to obtain different curvatures that follow the shape of a cover lens. Only the frame or partial frames, or the retaining elements on the frame or partial frame, differ. If one optical waveguide is to have a greater curvature than another, it is attached to opposing retaining elements on the frame at smaller spacings, resulting in a greater curvature. The frame thus has a rigidity that defines the curvature. This significantly reduces production costs.

According to a preferred embodiment of the invention, the at least two retaining elements are formed on the frame or partial frame, which is made of a rigid, or at least partially rigid material. The frame encompasses the optical waveguide at the narrow sides entirely, while the partial frame only encompasses part of the optical waveguide. If the frame is made of a rigid material, the curvature of the optical waveguide is defined by the spacing between the retaining elements. If the frame is only partially made of a rigid material, such that part of the frame is rigid, and part is flexible, the flexible part encompasses the optical waveguide. The flexible part is stiffer than the optical waveguide to obtain a durable curvature of the optical waveguide in the assembled state. The rigid part is used to retain the frame on the housing for the lighting device. This frame, made of two components, can be produced in a two-component injection molding process. The rigid part of the frame can be attached to the housing with threaded fasteners or snap-in connectors on the housing.

According to another embodiment of the invention, the optical waveguide is made of a transparent silicone material. By way of example, the optical waveguide can be produced in an injection molding process, thus requiring just one tool.

In a preferred embodiment of the invention, numerous light sources are distributed over the back surface of the optical waveguide. The light sources are preferably distributed evenly, resulting in a homogenous lighting of the optical waveguide. The optical waveguide preferably has micro-optical elements in an area on the back that is not populated with the light sources, which reflect the light entering it. The optical waveguide preferably has micro-optical elements on the front, in an axial extension of the light sources, that diffuse the light emitted at the front. This micro-optical elements can be placed within circles, for example, the centers of which are coaxial to the optical axes of the light sources. This results in a simple homogenization of the lighting of that surface area.

According to another embodiment of the invention, an optical panel is placed on the front of the optical waveguide, which has micro-optical elements on the side facing away from the optical waveguide for diffusing the emitted light. This optical panel is also flexible, and is preferably made of the same material as the optical waveguide. This supplementary optical panel advantageously enables an adjustment of the behavior of the emitted light to different requirements.

According to another embodiment of the invention, an optical film can be placed on the front of the optical waveguide, instead of an optical panel. This results in an even thinner optical waveguide module.

According to another embodiment of the invention, there is a cover on the back of the optical waveguide with a diffusing, reflective surface that results in a uniform background when the lighting device is not in use, and reflects diffused light exiting the back of the optical waveguide back into it when the lighting device is on.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
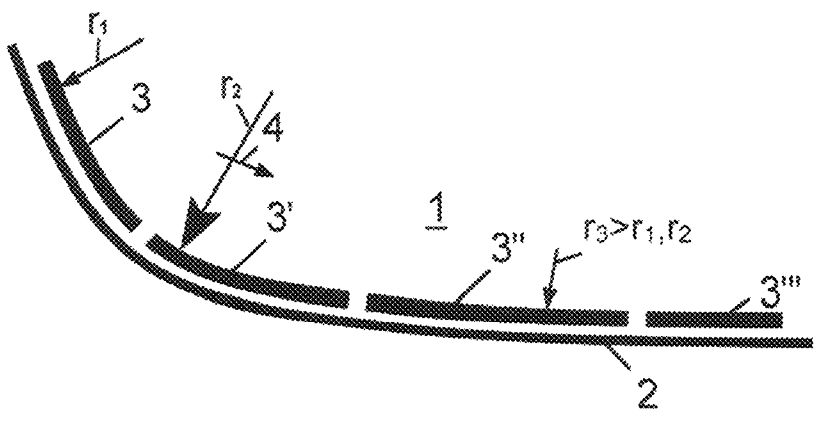
FIG. 1 shows a schematic illustration of a taillight from above, with a number of flat optical waveguides that are equidistant to a cover lens.
Figure 2:
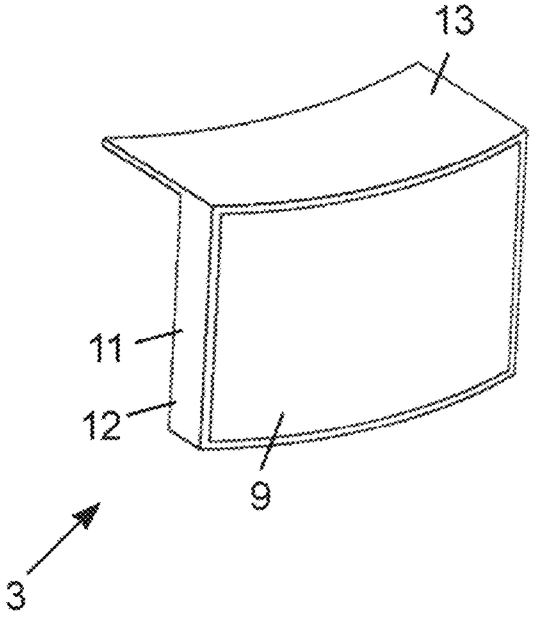
FIG. 2 shows the optical waveguide from the front.
Figure 3:
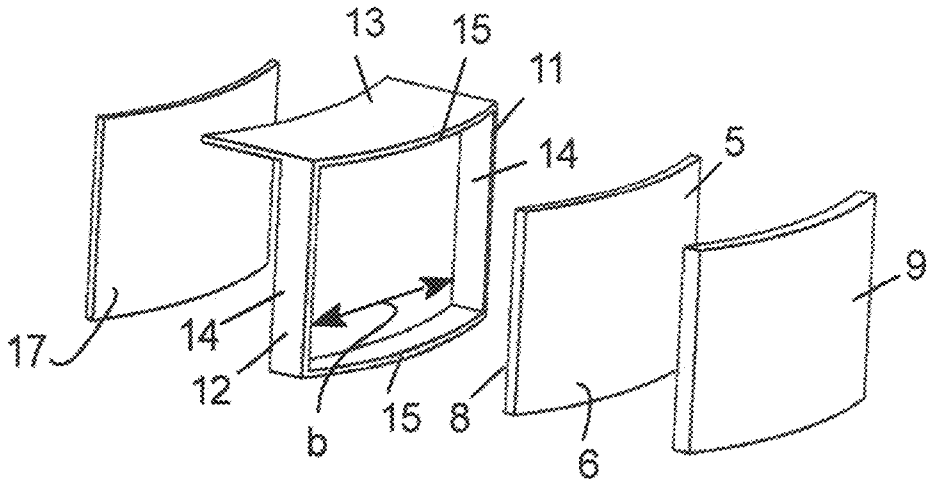
FIG. 3 shows the optical waveguide from the front in an exploded view.
Figure 4:
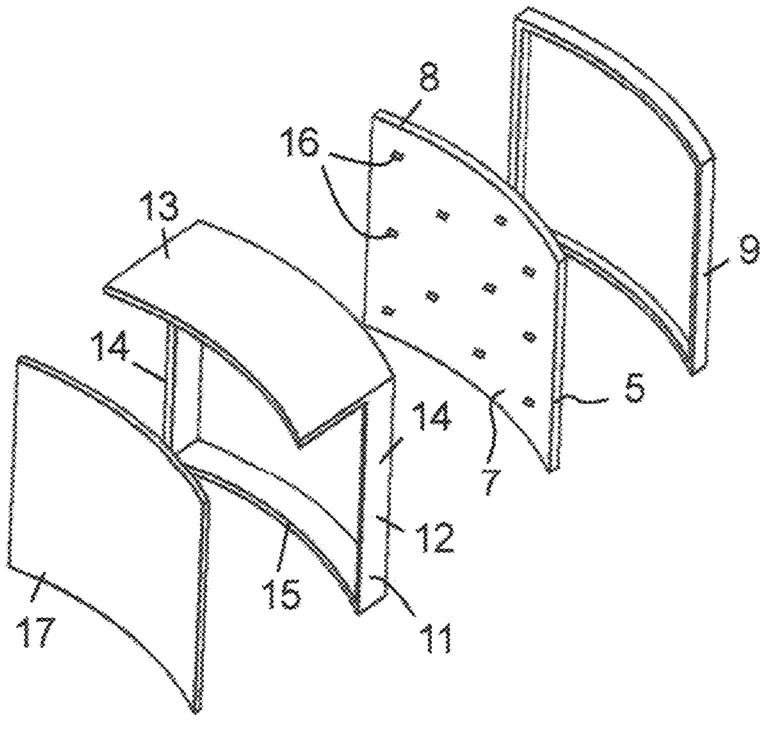
FIG. 4 shows the optical waveguide from the back in an exploded view.

Lighting devices in vehicles can be taillights or headlamps. FIG. 1 shows a housing 1 with an opening normally covered by a transparent cover lens 2. Numerous flat optical waveguide modules 3, 3', 3'', 3''' extend at an equidistant spacing to the cover lens 2 within the housing 1, which differ from one another in that they have different vertical and/or horizontal dimensions, and different curvatures. These four optical waveguide modules 3, 3', 3'', 3''' extend from the side of the vehicle toward the middle of the vehicle in the direction indicated by the numeral 4. The second optical waveguide module 3' is curved to a greater extent than the first optical waveguide module 3. The curvature radius $r_2$ of the second optical waveguide module 3' is shorter than the curvature radius $r_1$ of the first optical waveguide module 3. The curvature radii $r_1$, $r_2$ extend horizontally, such that the curvatures of the optical waveguide modules 3, 3', 3'', 3''' only run in the horizontal direction, as can be seen clearly in FIGS. 3 and 4. The third optical waveguide module 3'' has a greater curvature radius $r_3$ that the curvature radii $r_1$ and $r_2$ of the first and second optical waveguide modules 3, 3'. The fourth optical waveguide module 3''' is flat, and has a shorter horizontal length than the other optical waveguide modules 3, 3', 3''.

The optical waveguide modules 3, 3', 3'', 3''' are made of the same components, and only the first optical waveguide module shall be explained below, by way of example. The optical waveguide module 3 contains an optical waveguide that has opposing flat sides, specifically a front flat side 6, which forms a light emitting surface, and a back flat side 7. The front side 6 and back side 7 are connected by narrow sides 8. There is an optical panel 9 with numerous optical elements 10 in front of the front side 6 of the optical waveguide 5. This optical panel 9 covers the front side 6 of the optical waveguide. The optical waveguide 5 and optical panel 9 are both flexible, and preferably made of a highly transparent silicone.

The optical waveguide 5 and optical panel 9 are attached to a frame 11 by retainers (not shown). The frame 11 has a flexible section 12 that encompasses the narrow sides of the optical waveguide 5 and the optical panel 9. The frame 11 also has a rigid section 13, which is substantially transverse to an axis of the flexible section 12 and forms a retaining bracket that holds the optical waveguide 3 on the housing 1.

The frame 11 can be made in a two-component injection molding process. The flexibility or resilience of the flexible section 12 of the frame is preferably lower than the flexibility or resilience of the optical waveguide 5 and optical panel 9. The curvature of the optical waveguide 5 and optical panel 9 in the assembled state is defined by the width b of the flexible section 12 and/or the retainers on vertical parts 14 of the flexible section 12 of the frame. If this width b is less than a predefined value, the curvature of the optical waveguide and optical panel is increased, i.e. the curvature radius $r_1$ is shorter. This allows for the curvature of the optical waveguide 5 and optical panel 9 to be adjusted within a predefined range by the frame 11. In the simplest case, different curvatures can be obtained with different retainers. They do not have to be on just the vertical parts 14 of the frame, and can also be placed on the horizontal parts 15, resulting in a curvature in relation to the vertical axis.

Figure 5:
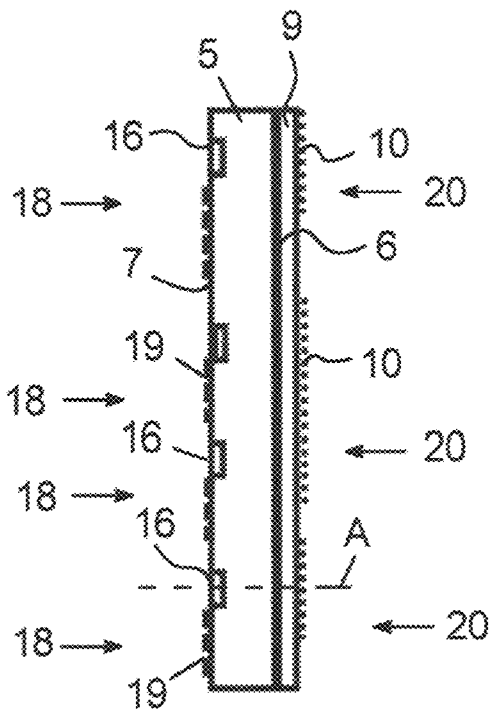
FIG. 5 shows a vertical cross section of the optical waveguide according to a first embodiment.

As shown in FIG. 5, there are numerous LED light sources 16 distributed over the back side 7 of the optical waveguide 5. These are placed in recesses in the back side 7, such that they are flush therewith. The LED light sources 16 are connected to one another by thin wires and in electrical contact with a plug.

There is a back cover 17 with a diffusing, reflective, preferably white, surface on the back side 7 of the optical waveguide 5. This back cover 17 can be an integral part of the frame 11, or it can be attached to the frame 11 and/or the optical waveguide 5. The back cover 17 forms a background surface for the optical waveguide module 3, and reflects any diffused light exiting the back surface 7 back into the optical waveguide 5 when the optical waveguide module 3 is in use.

As shown in FIG. 5, the back side 7 of the optical waveguide 5 has reflecting elements 19 in an area 18 where there are no LED light sources 1, which prevent undesired emissions of diffused light at the back side 7, and thus contribute to a homogenization of the lighting of the optical waveguide 5. These reflecting elements 19 can be produced in a structuring or printing process.

Figure 7:
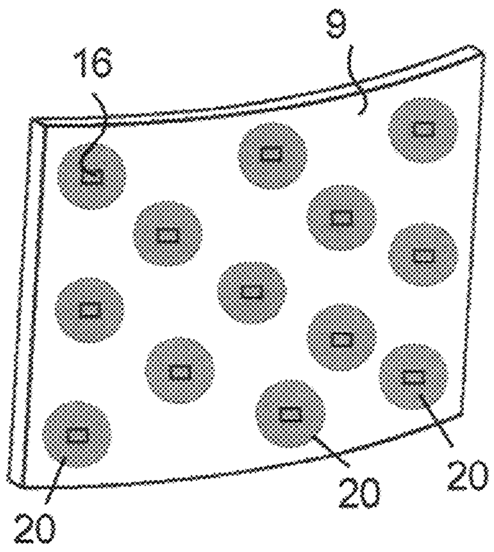
FIG. 7 shows the optical waveguide from the front, with the light sources on the back and diffusing areas on the front.

The optical panel 9 has optical elements 10 on the front side, facing away from the optical waveguide 5, in a specific area 20, which diffuse and/or reflect light entering the optical panel 9 from the optical waveguide 5. As shown in FIG. 7, the optical elements 10 are in circles 20 surrounding the respective LED light sources 16 in the present exemplary embodiment. These circles 20 are coaxial to the optical axes A of their dedicated light sources 16. This prevents a concentration of light, or lighter spots in front of the LED light sources 16 on the optical waveguide module 3.

The thickness of the optical panel 9 can range from 1 mm to 2 mm. The optical elements 10 are micro-optical elements.

The optical panel 9 can be replaced by an optical film with a thickness of 0.1 mm to 0.5 mm. This also has optical elements 10 with a micro-structure or diffusing structure.

Figure 6:
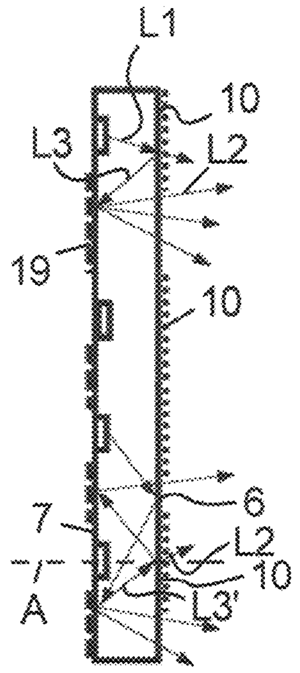
FIG. 6 shows a vertical cross section of the optical waveguide according to a second embodiment.

In another embodiment of the invention shown in FIG. 6, the optical waveguide module 3 has neither an optical panel, nor an optical film. Instead, the optical elements 10 are on the front side 6 of the optical waveguide 5. These optical elements 10 can be obtained in a structuring or printing process, as is the case with the optical panel 9.

As FIG. 6 shows, light beams L1 from the light sources 1, or light beams L2 that undergo total internal reflection on the flat sides 6, 7, are diffused by the optical elements 10. Light beams L3 that strike the back side 7 at a relatively steep angle are reflected by the reflecting elements 19, and then normally exit the front flat side 6 as light beams L2. A reflected light beam L3' could also be reflected by the optical elements 10, such that it then exits the front side at a different location along the optical waveguide after undergoing further total internal reflection.

There can also be just one optical waveguide 5 in a simple embodiment of the optical waveguide module 3, which has no dedicated optical elements 10.

The optical waveguide 5 could also have either reflecting elements 19 on the back side 7, or optical elements 10 on the front side 6.

The design of the optical waveguide module 3 with reflecting elements 19 and/or optical elements 10 depends on the desired degree of homogenization in the surface illumination.

According to another embodiment of the invention, not shown in the drawings, numerous optical panels could be placed in front of the optical waveguide 5, which have optical elements for shaping and focusing the light, such that the light emission is more convergent. The optical elements can be forms by prisms or strips, or they could form pyramids or other micro-optical elements or structures. The optical elements 21 can form a white grid of dots, or they could form lines, triangles, squares, polygons, or other geometric shapes.

The region 20 could also be entirely populated with optical elements if the thickness of the optical element layer complies with a desired residual transmission.

Figure 8:
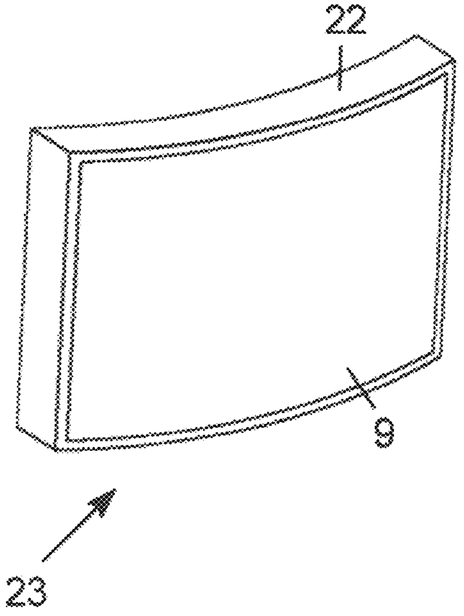
FIG. 8 shows the optical waveguide from the front, according to another embodiment.

According to another embodiment of the invention, shown in FIG. 8, there is a flat optical waveguide module that differs from the flat optical waveguide modules 3, 3', 3'', 3''' in that it has a frame 22 made of a rigid material. This frame 20 is preferably a rigid injection molded part, the shape of which corresponds to the section 12 of the frame for the waveguide modules 3, 3', 3'', 3'''. The frame 22 is permanently attached to the housing 1 by retainers (not shown).

The retainers can be snap-in, threaded, or adhesive retainers.

According to another embodiment of the invention, not shown herein, the flat optical waveguide can also be contained in partial frame that does not encompass all of the narrow sides 8 of the optical waveguide. By way of example, the partial frame can be U-shaped, ensuring that opposing narrow sides of the optical waveguide can be attached to opposing retainers on the partial frame, allowing for adjustment of the curvature.

LIST OF REFERENCE SYMBOLS

1 housing
2 cover lens
3, 3', 3'', 3''' flat optical waveguide module
4 direction
5 flat optical waveguide
6 front flat side
7 back flat side
8 narrow sides
9 optical panel
10 optical element
11 frame
12 flexible frame section
13 rigid frame section
14 frame part
15 frame part
16 LED light source
17 cover
18 area
19 reflecting element
20 area
22 frame
23 flat optical waveguide
b width
$r_1$, $r_2$, $r_3$ curvature radius
L1, L2, L3, L3' light beams

We claim:

1. A lighting device for vehicles, the lighting device comprising:
a light source; and
first and second flexible optical waveguides, each with opposing flat sides and narrow sides connecting the opposing flat sides, wherein a front flat side of each optical waveguide is a light emitting surface for light from the light source entering the optical waveguide, and wherein the front flat side of each optical waveguide has dedicated micro-optical elements,
wherein in a first configuration, each optical waveguide is flat,
wherein in a second configuration of the first optical waveguide, the first optical waveguide is held in a frame or a first part of the frame on at least the opposing narrow sides by retaining elements of the frame or the first part of the frame, such that the first optical waveguide has a defined curvature caused by the frame or the first part of the frame, and
wherein in a second configuration of the second optical waveguide, the second optical waveguide is held in the frame or a second part of the frame on at least the opposing narrow sides by retaining elements of the frame or the second part of the frame, such that the second optical waveguide has a defined curvature caused by the frame or the second part of the frame which is different from the curvature of the first optical waveguide caused by the frame or the first part of the frame.

2. The lighting device according to claim 1, wherein the retaining elements are formed on the frame or on the first or second parts of the frame, wherein the frame or first or second parts of the frame are made of a rigid material.

3. The lighting device according to claim 1, wherein the retaining elements are both on a flexible section of the frame containing the first or second optical waveguide and on a rigid section at a right angle to the flexible frame section, which is integrally connected thereto to fasten the frame to a housing for the lighting device.

4. The lighting device according to claim 1, wherein the first and second optical waveguides are made of a transparent silicone material.

5. The lighting device according to claim 1, wherein a number of light sources are placed in recesses on a back side of at least the first or second optical waveguide, and flush therewith.

6. The lighting device according to claim 1, wherein at least the first or second optical waveguide has reflecting elements on a back side in an area where light does not enter it, which reflect the light entering the waveguide toward the front side.

7. The lighting device according to claim 6, wherein the reflecting elements are elements formed in a printing or structuring process.

8. The lighting device according to claim 1, wherein an optical panel lies on the front side of at least the first or second optical waveguide, or the front side is covered by an optical film, either of which has micro-optical elements.

9. The lighting device according to claim 8, wherein the micro-optical elements on the optical panel are formed in a printing or structuring process.

10. The lighting device according to claim 8, wherein the optical panel has a thickness of 1 mm to 2 mm.

11. The lighting device according to claim 8, wherein the optical film has a thickness of 0.1 mm to 0.5 mm.

12. The lighting device according to claim 1, wherein optical elements on the front flat side of at least the first or second optical waveguide or a front side of the optical panel facing away from the optical waveguide are in an area in an axial extension of an optical axis (A) of the light source, and have a surface area that is larger than the surface area of the light source.

13. The lighting device according to claim 1, wherein a back side of at least the first or second optical waveguide has a cover made of a diffusing, reflective surface.

14. The lighting device according to claim 8, wherein another optical panel is place on the front of the optical panel or optical film, and/or the optical waveguide, which contains optical elements for shaping and focusing the light exiting the waveguide.

15. The lighting device according to claim 2, wherein retainers on the frame or on the first or second parts of the frame are on opposite sides thereof to define a spacing (b) between opposite narrow sides of each of the optical waveguides and/or the optical panel such that each of the optical waveguides or optical panel assumes a predefined curvature about an axis between the retaining elements in the assembled state.

16. The lighting device according to claim 2, wherein at least the first and second optical waveguides and frame and/or optical panel and/or back cover form a flat optical waveguide module, a number of which form horizontally and/or vertically adjacent and adjoining cover lenses inside a housing, at an equidistant spacing thereto.

17. A method of making a lighting device for vehicles, the method comprising the steps of:

providing a light source; and providing first and second flat flexible optical waveguides, each with opposing flat sides and narrow sides connecting the opposing flat sides, wherein a front flat side of each optical waveguide is a light emitting surface for light from the light source entering the optical waveguide, and wherein the front flat side of each optical waveguide has dedicated micro-optical elements, installing the first optical waveguide in a first part of a frame or in a first frame, the first part of the frame or the first frame having retaining elements on at least the opposing narrow sides of the first optical waveguide, wherein the installation of the first optical waveguide into the first part of the frame or the first frame causes the first optical waveguide to have a first defined curvature in an assembled state; and installing the second optical waveguide in a second part of the frame or in a second frame, the second part of the frame or the second frame having retaining elements on at least the opposing narrow sides of the second optical waveguide, wherein the installation of the second optical waveguide into the second part of the frame or the second frame causes the second optical waveguide to have a second defined curvature in the assembled state which is different from the curvature of the first optical waveguide caused by the first part of the frame or the first frame.

* * * * *